March 24, 1953 T. F. BELLINGER 2,632,875
SYNCHRONOUS MOTOR PROTECTIVE SYSTEM OPERATIVE ON PULL-OUT
Filed June 8, 1950
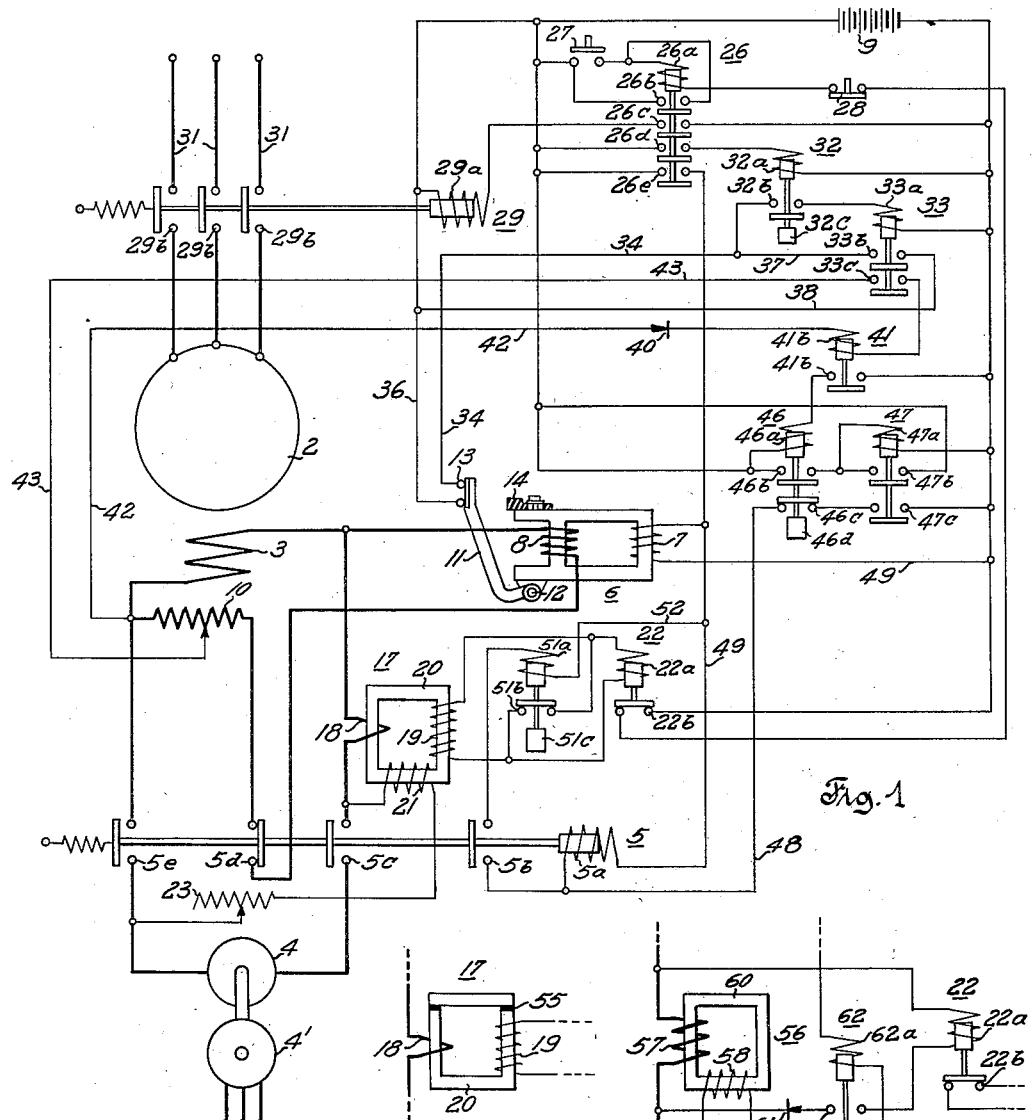
Fig. 1
Fig. 2
Fig. 3
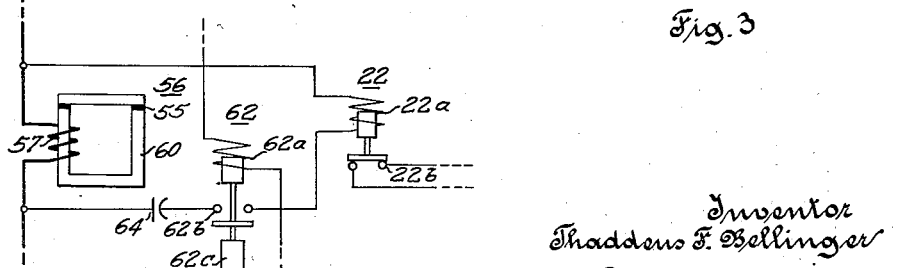
Fig. 4
Inventor
Thaddeus F. Bellinger
by Didier Journeaux
Attorney Patented Mar. 24, 1953

2,632,875

UNITED STATES PATENT OFFICE 2,632,875

SYNCHRONOUS MOTOR PROTECTIVE SYSTEM OPERATIVE ON PULL-OUT

Thaddeus F. Bellinger, West Allis, Wis., assignor to Allis-Chalmers Manufacturing Company, Milwaukee, Wis.

Application June 8, 1950, Serial No. 166,935

12 Claims. (Cl. 318—167)

This invention relates in general to synchronous motor control systems and in particular to systems for controlling the removal of the field excitation of the motor when the motor pulls out of synchronism.

In prior art systems of this type, a field application relay having a current winding traversed by the current induced in the field winding of the motor is utilized to connect the field winding to a source of direct current excitation when the motor approaches synchronous speed. Most of such systems also rely on the current winding of the field application relay to detect currents induced in the field winding when the motor pulls out of synchronism, for disconnecting the field winding from its source.

Such systems operate satisfactorily for motors in which the difference in magnitude between the induced current flowing during synchronization and the normal unidirectional excitation current is not great. However, in some motors, the difference in magnitude mentioned above is so large as to render exceedingly difficult the design of one field application relay which is sufficiently sensitive for both values of current, owing to the saturation of the relay core by the large unidirectional current flowing in the field during synchronous operation and the difficulty of building a relay dimensioned for such current.

This disadvantage can be overcome by using a field application relay for determining the point at which field excitation is to be applied and by using a separate electroresponsive device for detecting pull-out. Such electroresponsive device may be an alternating current transformer having a primary winding traversed by the current flowing in the motor field winding and having a sensitive relay inductively coupled thereto for energization in response to induced currents of predetermined magnitude flowing in the primary winding. Also, a reactor having a current winding connected in the circuit of the motor field winding and having a relay conductively coupled thereto may be utilized. To oppose the saturating effect of the unidirectional field current, the transformer or reactor may be equipped with a winding supplied with current in a direction opposing the flux produced by the field current, or it may be provided with air gaps in its core. Operation of the sensitive relay may be utilized to disconnect the field winding from the direct current source for resynchronizing or to operate an alarm or to disconnect the motor armature from its source.

It is therefore an object of this invention to provide an improved synchronous motor protective system which will automatically remove field excitation if the motor pulls out of step.

It is a further object of this invention to provide a system for controlling disconnection of the field winding of a synchronous motor from its source under certain conditions, in which the disconnecting means are rendered unresponsive for a predetermined time.

It is a further object of this invention to provide a synchronous motor protective system utilizing an electroresponsive device in which an element of the device is utilized to prevent saturation of the device.

Objects and advantages other than those outlined above will be readily apparent from the following detailed description when read in connection with the accompanying drawing in which:

Fig. 1 diagrammatically illustrates the connections and apparatus embodied in one form of the invention; and Figs. 2, 3 and 4 partly illustrate modifications of the connections and apparatus illustrated in Fig. 1.

In the embodiment illustrated in Fig. 1 a synchronous motor 2 is shown as provided with a field winding 3 which may be energized from any suitable source of direct current such as an exciter 4. Exciter 4 may be driven by any suitable means such as the separate motor 4. Field winding 3 may be connected to and disconnected from exciter 4 by suitable switching means such as contacts 5c and 5e of a field contactor 5.

The connection of field winding 3 to exciter 4 by contactor 5 is controlled through a suitable field application relay 6. Relay 6 is preferably of the type disclosed in U. S. 2,478,693, granted to William J. Herziger, and comprises a direct current winding 7 energized from a suitable direct current source such as a battery 9, and an alternating current winding 8. With contactor 5 in the position shown, winding 8 is connected in series with field winding 3 and a suitable field discharge resistor 10 through contacts 5d of contactor 5, to be thereby energized by a current proportional to the current induced in field winding 3 by the motor armature. Windings 7 and 8 are wound upon a generally E-shaped core at the open end of which an armature 11 is mounted on a pivot 12 and biased by gravity to the position shown to close a pair of contacts 13. Armature 11 is attracted by the resultant flux of windings 7 and 8, and the value of the resultant flux required to retain armature 11 attracted may be readily varied by adjustment of the position of a nonmagnetic block 14 adjustably mounted on the E-shaped core and extending more or less beyond the end face of the upper core member.

The disconnection of field winding 3 from exciter 4 is controlled by means including an electroresponsive device such as an alternating current transformer 17 having a primary winding 18, a secondary winding 19, a magnetic core 20 and a biasing winding 21.

Primary winding 18 is connected in series with field winding 3 when contacts 5c and 5e are closed to thereby supply to winding 18 a current proportional to the current induced by the armature winding in field winding 3. Secondary winding 19 is connected to the coil 22a of a pull-out current relay 22, thereby inductively coupling relay 22 to primary winding 18. Biasing winding 21 is connected to a suitable source of direct current, such as exciter 4, through an adjustable resistor 23 and is thereby supplied with an adjustable constant direct current when exciter 4 is running.

Initiation of operation of the system is under the control of a master relay 26 having an energizing coil 26a. The energization circuit of coil 26a may be traced from one side of battery 9, through a starting pushbutton switch 27, coil 26a, a stop pushbutton switch 28, contacts 22b of relay 22, back to the other side of battery 9. Contacts 26b of relay 26 bridge switch 27 to provide sealing in of relay 26 upon energization. Contacts 26c when closed complete the energizing circuit through battery 9 for a coil 29a of a main line contactor 29 having contacts 29b for connecting the armature winding of motor 2 to a suitable source of alternating current represented by conductors 31. Contacts 26e connect winding 7 of field application relay 6 across battery 9 and control the energization circuit of coil 5a of contactor 5. Contacts 26d complete the energization circuit of the coil 32a of a timing relay 32 having contacts 32b.

Relay 32 is of the type involving a time delay only upon energization, which time delay is obtained by any suitable means such as a dashpot 32c. Contacts 32b are connected in the circuit of the coil 33a of an auxiliary relay 33 having contacts 33b, 33c. The energizing circuit of coil 33a may be traced from the right side of battery 9 through coil 33a, contacts 32b, a conductor 34, through contacts 13 of field application relay 6, and through a conductor 36 back to battery 9. Contacts 33b are connected by two conductors 37, 38 to the conductors 34, 36 to thereby seal in relay 33 across contacts 13. Closure of contacts 33c connects the coil 41a of a polarized relay 41 through conductors 42, 43 across an adjustable portion of field discharge resistor 10. Relay 41 is polarized by virtue of the connection of a rectifier 40 in series with coil 41a. Relay 41 is provided with contacts 41b which connect the energizing coil 46a of a second timing relay 46 across battery 9.

Relay 46 is provided with normally open contacts 46b and normally closed contacts 46c, and is of the type involving a time delay only upon deenergization, which time delay may be obtained by a dashpot 46b. Contacts 46b connect the coil 47a of a relay 47 across battery 9. Contacts 47b seal in coil 47a across contacts 46b, while contacts 47c and 46c complete the energizing circuit of coil 5a of field contactor 5 through a circuit which may be traced from the right side of battery 9, through contacts 47c, 46c, a conductor 48, coil 5a, conductor 49 and through contacts 26e back to battery 9.

Contacts 5b of contactor 5 control the energization of the coil 51a of a relay 51 provided with contacts 51b. The circuit for coil 51a may be traced from the left side of battery 9 through contacts 26e, conductor 49, a conductor 52, coil 51a, contacts 5b, conductor 48, contacts 47c, 46c, back to battery 9. Relay 51 is also provided with a dashpot 51c to provide a time delay in the operation of relay 51 only upon energization of coil 51a.

Starting of motor 2 is initiated by closing pushbutton switch 27, thereby energizing coil 26a of master relay 26. Contacts 26b close to seal in relay 26 and contacts 26c close to complete the energizing circuit of coil 29a of contactor 29, thereby connecting the armature winding of motor 2 to conductors 31. The armature of motor 2 is energized and induces in field winding 3 a current having a magnitude and frequency inversely proportional to the speed of rotation. This induced current also flows through discharge resistor 10, contacts 5d and winding 8 of field application relay 6.

Contacts 26e close to energize winding 7 of field application relay 6 from battery 9. Contacts 26d close to energize coil 32a of relay 32, and relay 32 closes its contacts 32b in the circuit of coil 33a after a predetermined time delay. This time delay is of sufficient length to permit the current in winding 8 to produce sufficient flux to attract armature 11, thereby opening contacts 13. Opening of contacts 13 breaks the energizing circuit of coil 33a, and relay 33 consequently remains deenergized.

As the speed of motor 2 increases and approaches synchronous speed, the frequency and magnitude of the current induced in field winding 3 decrease. At an adjustable predetermined value of current in winding 8, the resultant flux in relay 6 remains for a sufficient length of time below the value necessary to retain armature 11 attracted, and the armature drops out to close contacts 13. The direction of current through winding 7 is so chosen that the resultant flux in relay 6 becomes insufficient to retain armature 11 during the positive half cycle of the current induced in field winding 3. Closure of contacts 13 completes the energizing circuit for coil 33a of relay 33, which closes its contacts 33c to seal itself in across contacts 13. Contacts 33d also close to connect coil 41a of polarized relay 41 across a portion of the field discharge resistor 10. Relay 41 is so poled as to conduct current only during the positive half cycles of the current flowing in resistor 10, and therefore remains deenergized during the negative half cycle of current in resistor 10 immediately following closure of contact 13.

On commencement of the positive half cycle following the positive half cycle during which contact 13 closed, relay 41 is supplied with sufficient current to close its contacts 41b and thereby energize coil 46a. Relay 46 immediately closes its contacts 46b, and opens its contacts 46c, contacts 46b completing the energizing circuit of coil 47a and contacts 46c breaking the energizing circuit for coil 5a. Energization of coil 47a causes contacts 47b to close to seal in relay 47 and causes contacts 47c to close in the circuit of coil 5a. However, coil 5a remains deenergized owing to the opening of contacts 46c described above.

On the negative half cycle of current in resistor 10 following energization of polarized relay 41, relay 41 becomes deenergized and opens its contacts 41b to deenergize coil 46a. After a predetermined time, relay 46 drops out to close contacts 46c to complete the energizing circuit for coil 5a. Contactor 5 then opens its contacts 5d to disconnect field winding 3 from discharge resistor 10, and closes its contacts 5c and 5e to connect field winding 3 to exciter 4, in series with primary winding 18 of transformer 17. The exact point in the negative half cycle of current at which field winding 3 is connected to exciter 4 may be readily varied by adjustment of the drop out time of relay 46 to secure the most advantageous operation of the system.

To prevent actuation of relay 22 in response to transient currents induced in field winding 3 when the motor pulls into synchronism upon connection of the field winding 3 to exciter 4, contact means are provided for short circuiting relay 22 for a predetermined time after connection of field 3 to exciter 4. These means include relay coil 51a which is energized by contact 5b of field contactor 5, through a circuit previously described, upon connection of exciter 4 to field winding 3. Relay 51 has a time delay upon energization, during which time contacts 51b short circuit relay coil 22a to thereby prevent transient currents induced in winding 19 from actuating relay 22. After the predetermined time, contacts 51b open to render relay 22 responsive to the current flowing in winding 19. Biasing winding 21 of transformer 17 is supplied with current in a direction to oppose the flux produced in the core of transformer 17 by the unidirectional field current traversing primary winding 18. Winding 21 thus prevents saturation of the core of transformer 17, thereby rendering transformer 17 very sensitive to currents produced by a pull-out of motor 2.

If after connection of field winding 3 to exciter 4, the motor pulls out of synchronism, an induced current flows in field winding 3 and primary winding 18 of transformer 17, thereby inducing in secondary winding 19 a current which is a measure of the current induced in field winding 3. Windings 21 and 18 are so designed that the time constant of winding 18 is considerably less than that of winding 21, to insure rapid response of relay 22 upon pull-out of motor 2. If the current induced in winding 19 is of sufficient magnitude, depending upon the setting of relay 22, relay 22 is actuated to open its contacts 22b in the circuit of coil 26a, thereby deenergizing relay 26. Deenergization of relay 26 deenergizes coil 29a through contact 26c to disconnect motor 2 from conductors 31 and deenergizes coil 5a through opening of contact 26e to disconnect field winding 3 from exciter 4.

In the modification partly shown in Fig. 2, core 20 of electroresponsive device 17 is provided with air gaps by insertion of nonmagnetic blocks or shims 55 in the magnetic circuit. The use of the air gap eliminates the necessity of using biasing winding 21, since the air gap effectively prevents saturation of the core of device 17 by the unidirectional field current flowing in primary winding 18.

Fig. 3 partly shows a modification in which the electroresponsive device is in the form of a reactor 56 having a magnetic core 60. Reactor 56 is provided with a current winding 57 which is connected in the circuit of field winding 3 similarly to winding 18 of transformer 17. Coil 22a is connected directly across current winding 57. Winding 57 offers very little impedance to the flow of direct current during normal synchronous operation of motor 2 and therefore very little current flows through coil 22a during this time. However, when motor 2 pulls out of synchronism, winding 57 presents a substantial impedance to the alternating current induced in field winding 3, thereby energizing coil 22a with a substantial current to cause contacts 22b to close and disconnect the armature and field winding 3, as hereinbefore described. Reactor 56 may be provided with a biasing winding 58 energized from any suitable direct current source to prevent saturation of the core, or it may be provided with air gaps as in the modification shown in Fig. 2.

If desired a rectifier 61 may be connected in series with coil 22a across current winding 57 of reactor 56. The rectifier 61 is poled to prevent the flow of normal unidirectional excitation current through coil 22a, thereby insuring that relay 22 is not energized by the unidirectional current in winding 3 during synchronous operation. To prevent energization of relay 22 in response to transient currents induced in winding 3 upon field application, a relay 62 having a coil 62a, contacts 62b and a dashpot 62c is provided. Coil 62a is energized through the same circuit as coil 51a in Fig. 1, and normally open contacts 62b are connected in series with coil 22a and rectifier 61. Dashpot 62c provides a time delay only upon energization of coil 62a. Therefore, when coil 62a is energized by operation of field contactor 5, through a circuit previously described, contacts 62b remain open for a predetermined time, thereby rendering relay 22 unresponsive for a predetermined time following closure of the switching means 5.

Fig. 4 partly shows a modification of the circuits in which a capacitor 64 is connected in series with coil 22a across the current winding 57 of reactor 56. Core 60 of the reactor is provided with air gaps by inserting nonmagnetic blocks 55 in the magnetic circuit to prevent saturation of the core 60. Capacitor 64 prevents the flow of normal unidirectional excitation current through coil 22a, but when the motor pulls out of synchronism, the alternating current induced in field winding 3 will flow through capacitor 64 and coil 22a to disconnect field winding 3 from exciter 4. Time delay relay 62 is provided to prevent actuation of relay 22 in response to transient currents upon field application.

Although only a few embodiments of the present invention have been shown and described, it will be readily apparent to those skilled in the art that various modifications may be made therein without departing from the spirit of the invention as expressed in the appended claims.

It is claimed and desired to secure by Letters Patent:

1. In a system comprising a synchronous motor having an armature winding and a field winding, a source of alternating current, a source of direct current, and means for connecting said armature winding to said source of alternating current, the combination of switching means for connecting said field winding to said direct current source to supply direct current to said field winding, a first relay responsive to the current induced by said armature winding in said field winding prior to closure of said switching means for causing closure of said switching means to connect said field winding in circuit with said direct current source, an electroresponsive device having a magnetic core and a current winding connected in said field winding circuit, a second relay coupled to said current winding and responsive to said induced current after closure of said switching means for causing opening of said switching means to disconnect said field winding from said direct current source, and means including an element of said device for preventing saturation of said core by said direct current.

2. In a system comprising a synchronous motor having an armature winding and a field winding, a source of alternating current, a source of direct current, and means for connecting said armature winding to said source of alternating current, the combination of switching means for connecting said field winding to said source of direct current, a first relay responsive to the current induced by said armature winding in said field winding prior to closure of said switching means for causing closure of said switching means to connect said field winding in circuit with said direct current source, an electroresponsive device having a current winding connected in said field winding circuit, a second relay coupled to said current winding and responsive to said induced current for causing opening of said switching means to disconnect said field winding from said direct current source, and a third relay energized in response to closure of said switching means for rendering said second relay unresponsive to said induced currents for a predetermined time following closure of said switching means.

3. In a system comprising a synchronous motor having an armature winding and a field winding, a cource of alternating current, a source of direct current, and means for connecting said armature winding to said source of alternating current, the combination of switching means for connecting said field winding to said direct current source to supply direct current to said field winding, a relay responsive to the current induced by said armature winding in said field winding prior to closure of said switching means for causing closure of said switching means to connect said field winding to said direct current source, means for causing opening of said switching means to disconnect said field winding from said direct current source including a current transformer responsive to current induced in said field winding after closure of said switching means, said current transformer having a magnetic core and a current winding connected in circuit with said field winding, and means including an element of said transformer for preventing saturation of said core by said direct current.

4. In a system comprising a synchronous motor having an armature winding and a field winding, a source of alternating current, a source of direct current, and means for connecting said armature winding to said source of alternating current, the combination of switching means for connecting said field winding to said direct current source, a first relay responsive to the current induced by said armature winding in said field winding prior to closure of said switching means for causing closure of said switching means to connect said field winding to said source of direct current, a current transformer having a primary winding, a secondary winding and a biasing winding, means for supplying to said primary winding a current which is a measure of the current induced in said field winding after closure of said switching means, means for supplying to said biasing winding a constant direct current, and a second relay responsive to the current flowing in said secondary winding for causing opening of said switching means to disconnect said field winding from said direct current source.

5. In a system comprising a synchronous motor having an armature winding and a field winding, a source of alternating current, a source of direct current, and means for connecting said armature winding to said source of alternating current, the combination of switching means for connecting said field winding to said direct current source, a first relay responsive to the current induced by said armature winding in said field winding prior to closure of said switching means for causing closure of said switching means to connect said field winding to said direct current source, a current transformer having a primary winding, a secondary winding and a biasing winding, means for supplying to said biasing winding a constant direct current, means for supplying to said primary winding a current proportional to the current induced in said field winding after closure of said switching means, a second relay responsive to a predetermined flow of current in said secondary winding for causing opening of said switching means to disconnect said field winding from said direct current source, and means for preventing operation of said second relay in response to transient currents produced in said field winding upon connection of said field winding to said direct current source.

6. In a system comprising a synchronous motor having an armature winding and a field winding, a source of alternating current, a source of direct current, and means for connecting said armature winding to said source of alternating current, the combination of switching means for connecting said field winding to said direct current source, a first relay responsive to the current induced by said armature winding in said field winding prior to closure of said switching means for causing closure of said switching means to connect said field winding to said source of direct current, a current transformer having a primary winding, a secondary winding and a biasing winding, means for supplying to said biasing winding a constant direct current, means for supplying to said primary winding a current proportional to the current induced in said field winding after closure of said switching means, a second relay having a coil responsive to current of predetermined magnitude in said secondary winding for causing said switching means to disconnect said field winding from said direct current source, and contact means for short circuiting said coil for a predetermined time after connection of said field winding to said direct current source to prevent operation of said second relay in response to transient currents induced in said field winding upon connection of said field winding to said direct current source.

7. In a system comprising a synchronous motor having an armature winding and a field winding, a source of alternating current, a source of direct current, and means for connecting said armature winding to said source of alternating current, the combination of switching means for connecting said field winding to said direct current source, a first relay responsive to the current induced by said armature winding in said field winding prior to closure of said switching means for causing closure of said switching means to connect said field winding to said direct current source, a current transformer having a primary winding, a secondary winding and a biasing winding, means for supplying to said biasing winding a constant direct current, means for supplying to said primary winding a current proportional to the current induced in said field winding after closure of said switching means, a second relay responsive to current of predetermined magnitude flowing in said secondary winding for causing said switching means to disconnect said field winding from said direct current source, and means including an element of said switching means responsive to closure of said switching means for rendering said second relay unresponsive to said secondary current for a predetermined time following closure of said switching means.

8. In a system comprising a synchronous motor having an armature winding and a field winding, a source of alternating current, a source of direct current, and means for connecting said armature winding to said source of alternating current, the combination of switching means for connecting said field winding to said direct current source, a first relay responsive to the current induced by said armature winding in said field winding for controlling closure of said switching means to connect said field winding to said direct current source, a current transformer having a primary winding, a secondary winding and a biasing winding, means for supplying a constant direct current to said biasing winding, means for supplying to said primary winding a current proportional to the current induced in said field winding after closure of said switching means, a second relay responsive to current of predetermined magnitude flowing in said secondary winding for causing opening of said switching means to disconnect said field winding from said direct current source, and a third relay energized in response to closure of said switching means for rendering said second relay unresponsive to current flow in said secondary winding for a predetermined time following closure of said switching means.

9. In a system comprising a synchronous motor having an armature winding and a field winding, a source of alternating current, a source of direct current, and means for connecting said armature winding to said source of alternating current, the combination of switching means for connecting said field winding to said direct current source to supply said field winding with direct current, a first relay responsive to the current induced in said field winding for controlling closure of said switching means to connect said field winding in circuit with said direct current source, a reactor having a magnetic core and a current winding connected in said field winding circuit, a second relay connected across said current winding and responsive to said induced current after closure of said switching means for causing opening of said switching means to disconnect said field winding from said direct current source, and a rectifier connected in series with said second relay across said current winding for preventing energization of said second relay by said direct current.

10. In a system comprising a synchronous motor having an armature winding and a field winding, a source of alternating current, a source of direct current, and means for connecting said armature winding to said source of alternating current, the combination of switching means for connecting said field winding to said direct current source to supply direct current to said field winding, a first relay responsive to the current induced by said armature winding in said field winding prior to closure of said switching means for causing closure of said switching means to connect said field winding in circuit with said direct current source, a reactor having a magnetic core and a current winding connected in said field winding circuit, a second relay connected across said current winding and responsive to said induced current after closure of said switching means for causing opening of said switching means to disconnect said field winding from said direct current source, and a capacitor connected in series with said second relay across said current winding for preventing energization of said second relay by said direct current.

11. In a system comprising a synchronous motor having an armature winding and a field winding, a source of alternating current, a source of direct current, and means for connecting said armature winding to said source of alternating current, the combination of switching means for connecting said field winding to said direct current source to supply direct current to said field winding, a first relay responsive to the current induced by said armature winding in said field winding prior to closure of said switching means for causing closure of said switching means to connect said field winding in circuit with said direct current source, a reactor having a magnetic core and a current winding connected in said field winding circuit, a second relay connected across said current winding and responsive to said induced current after closure of said switching means for causing opening of said switching means to disconnect said field winding from said direct current source, a rectifier connected in series with said second relay across said current winding for preventing energization of said second relay by said direct current, and means including an element of said reactor for preventing saturation of said core by said direct current.

12. In a system comprising a synchronous motor having an armature winding and a field winding, a source of alternating current, a source of direct current, and means for connecting said armature winding to said source of alternating current, the combination of switching means for connecting said field winding to said direct current source to supply direct current to said field winding, a relay responsive to the current induced by said armature winding in said field winding prior to closure of said switching means for causing closure of said switching means to connect said field winding in circuit with said direct current source, means for causing opening of said switching means to disconnect said field winding from said direct current source including an electroresponsive device having a magnetic core and a current winding connected in circuit with said field winding circuit to be responsive to current induced by said armature winding in said field winding after closure of said switching means, and means including an element of said device for preventing saturation of said core by said direct current.

THADDEUS F. BELLINGER.

REFERENCES CITED

The following references are of record in the file of this patent:

UNITED STATES PATENTS

| Number | Name | Date |
| --- | --- | --- |
| 2,150,662 | Swanson | Mar. 14, 1939 |
| 2,150,664 | Swanson | Mar. 14, 1939 |
| 2,407,121 | Winter | Sept. 3, 1946 |
| 2,478,693 | Herziger | Aug. 9, 1949 |
| 2,504,812 | Daugert | Apr. 18, 1950 |
| 2,530,997 | Schaelchin | Nov. 21, 1950 |